(12) United States Patent
Kiel

(10) Patent No.: US 10,773,825 B1
(45) Date of Patent: Sep. 15, 2020

(54) LASER LIGHTING SYSTEM FOR USE IN LANDING AN AIRCRAFT IN A DEGRADED VISUAL ENVIRONMENT

(71) Applicant: Taylor L. Kiel, Huntsville, AL (US)

(72) Inventor: Taylor L. Kiel, Huntsville, AL (US)

( * ) Notice: Subject to any disclaimer, the term of this patent is extended or adjusted under 35 U.S.C. 154(b) by 0 days.

(21) Appl. No.: 16/554,614

(22) Filed: Aug. 28, 2019

Related U.S. Application Data

(63) Continuation of application No. 14/079,408, filed on Nov. 13, 2013, now abandoned.

(51) Int. Cl.
*B64F 1/20* (2006.01)
*B64D 47/04* (2006.01)

(52) U.S. Cl.
CPC .................................. *B64D 47/04* (2013.01)

(58) Field of Classification Search
None
See application file for complete search history.

(56) References Cited

U.S. PATENT DOCUMENTS

| | | | | |
|---|---|---|---|---|
| 3,671,963 | A * | 6/1972 | Assouline | G01S 13/913 342/53 |
| 3,978,342 | A * | 8/1976 | Hagen | G01S 17/87 250/495.1 |
| 5,315,296 | A * | 5/1994 | Kaiser | G05D 1/0646 340/946 |
| 2002/0074523 | A1 * | 6/2002 | Machi | B64D 47/04 250/495.1 |
| 2006/0187087 | A1 * | 8/2006 | Greene | B60Q 11/00 340/951 |
| 2012/0069562 | A1 * | 3/2012 | Singer | F21V 7/0025 362/231 |
| 2014/0062755 | A1 * | 3/2014 | Kabrt | G01S 7/003 342/27 |

* cited by examiner

*Primary Examiner* — Brent Swarthout
(74) *Attorney, Agent, or Firm* — Russ Weinzimmer & Associates, P.C.

(57) ABSTRACT

Apparatus and method for establishing and maintaining a visual reference on a surface below an aircraft for the purpose of landing the aircraft. The apparatus includes an infrared, green, and/or red laser that produces a laser beam terminating in a spot or pattern on a surface below the aircraft, the beam being no more than 1 mW. The laser can be mounted on a lower portion of the nose of the aircraft, and in a fixed direction that remains fixed during flight. The apparatus can also include a light assembly that houses the laser and maintains it in the fixed direction. The light assembly includes a shroud that extends around a front face of the light assembly, and extends from the front face of the light assembly in the fixed direction of the laser. The light assembly can also house non-laser light sources which produce white, green, and/or infrared light.

50 Claims, 10 Drawing Sheets

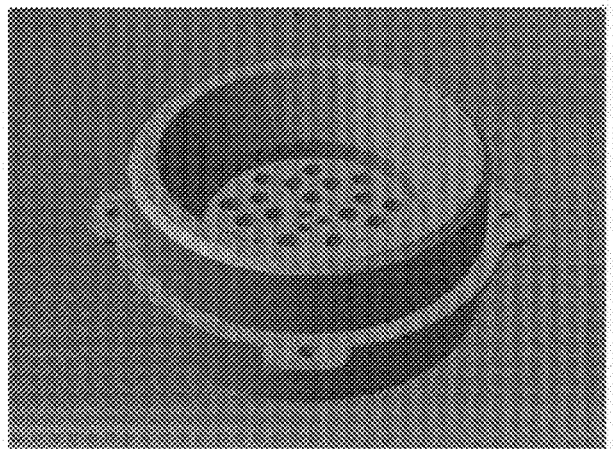 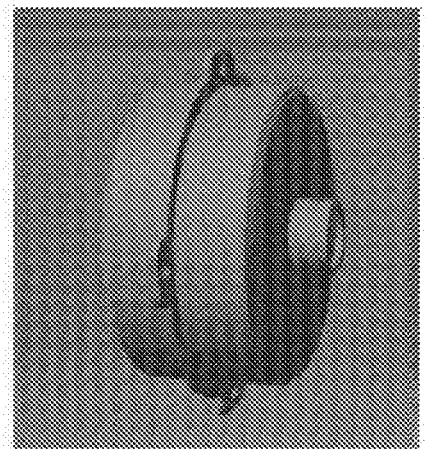
FIG. 7A  FIG. 7B
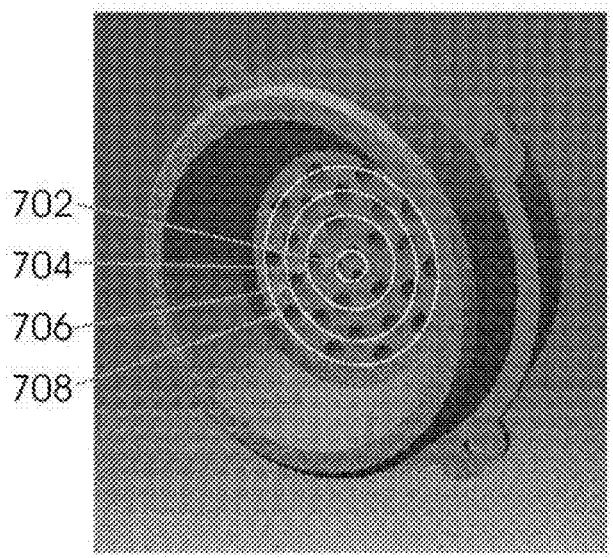
FIG. 7C

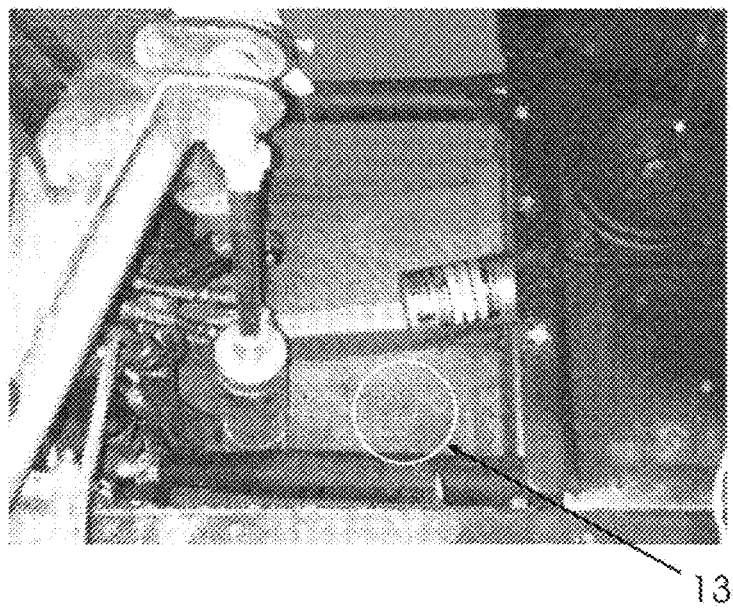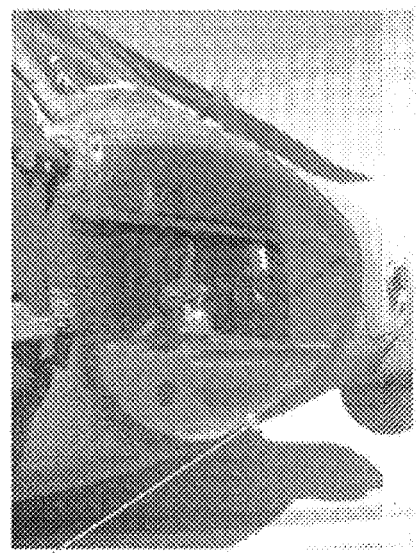
FIG.13A  FIG. 13B
FIG. 14

LASER LIGHTING SYSTEM FOR USE IN LANDING AN AIRCRAFT IN A DEGRADED VISUAL ENVIRONMENT

CROSS-REFERENCES TO RELATED APPLICATIONS

This application is a Continuation of U.S. patent application Ser. No. 14/079,408, filed Nov. 13, 2013, now abandoned, the entire content of which is herein incorporated by reference.

FIELD OF THE INVENTION

One or more embodiments of the present invention relate to illumination systems for assisting in landing aircraft in a degraded visual environment.

BACKGROUND

Rotorcraft (e.g., helicopters) and VTOL (vertical takeoff and landing) aircraft have a natural tendency to stir particulates into the air with their downwash when operating near the Earth's surface. This typically occurs while maintaining or transitioning in or out of the hovering flight regime, at an altitude that is within one to two times the equivalent rotor diameter. In certain environments, a relatively high concentration of stirred particulates, typically dust, may significantly obscure the pilot(s) field of view (FOV). The particulates can result in the loss of outside visual references, or brownout (in a dust environment), which can induce spatial disorientation in a pilot. The pilot(s) may not be able to see the ground. Depending on conditions, particulates may comprise dust, sand, snow, or other materials that can become airborne either due to rotor downdraft or local weather conditions.

The difficulty of a brownout situation is further compounded at night, because there are fewer visual cues available. Further, pilots (especially military aviators) may be using night-vision goggles (NVGs) which typically restrict the FOV to 40°. Using NVGs, also referred to as flying "aided," provides a visual acuity of 20/25 at best [Army 2007A]. Due to the challenges involved in such operations, pilots learn to use a variety of compensatory methods.

One method of compensation is to maintain enough forward airspeed during the approach and touchdown to outrun the formation of particulates and prevent the particulate formation from enveloping the cockpit. While effective in some situations, this method is not suitable for many landing zones, particularly those that are rough, sloping, confined, or pinnacle. Another method is referred to as termination to a point OGE (out of ground effect) [Army 2007B, Army 2013]. This method requires more power. The initial approach is to a high hover position directly over the intended point of landing. The high hover position is used to stir and dissipate the dust before descending to the ground. Hovering OGE is effective is some situations, but there are disadvantages. First, depending on the aircraft gross weight and environmental conditions, the power required may not be available to hover OGE. Second, it may not be a tactically advisable maneuver, because it exposes the aircraft in its most vulnerable state for an extended period. Third, descending from an OGE hover surrounded by a ring of circulating dust can induce spatial disorientation, resulting in improper control manipulation, consequent aircraft drift, and/or an unanticipated, possibly damaging touchdown rate.

Generally, in helicopters, once outside references are lost out of the windshield, focus is directed through the chin bubble and/or other cockpit door windows. If references are lost through the chin bubble and windows, the focus transitions to the flight instruments, and the approach is aborted using an instrument take-off (ITO). Technically, since the maneuver is not initiated from the ground, it is actually more a modified "go-around." Once above the dust with adequate visibility, the crew may continue visually and re-evaluate the situation.

Regardless of the method employed, there is always the potential to become partially or completely enveloped in dust. At night, when shifting focus from the windshield to the chin bubble or other windows, NVG use provides additional limitations. When looking through NVGs, depth perception is severely limited, especially at close ranges. The resolution at close range may be lower due to individual focus settings or constraints. The pilot may not have a clear sight picture of the immediate ground surface during the final stage of an approach. Cross-checking the chin bubble or cockpit door window looking through NVGs requires a large head movement that can be hazardous during the critical final moments of an approach.

An alternative, not printed in Army training manuals, is used in some cases to provide improved visibility beneath the aircraft. The landing light or search light is turned on, and the pilot looks beneath the NVG eyepieces and through the chin bubble or cockpit door window using the unaided eye. This technique can offer the best combination of available options by allowing the pilot to divide his/her attention by looking through the windshield using the NVGs (arrow 102) at horizon associated references and maintaining a good ground reference cross-check by glancing through the chin bubble unaided (arrow 104), as illustrated in FIG. 1.

One problem with using landing lights or search lights in this way is that tactical considerations may be sacrificed to the intensity of the light. Further, the landing light and searchlight are considered incompatible with NVGs, because they are conventional white lights (unless the searchlight is infrared). The compatibility issue is, however, more of a misconception than a reality with modern NVGs. Modern NVGs, such as the AN/AVS-6(V)3 (Exelis Night Vision, Roanoke Va.), have automatic brightness control (ABC) and bright source protection (BSP) which are built-in features designed to prevent blinding the user or damaging the NVGs. However, most white lights are still not conducive for use with NVGs, because ambient light is amplified approximately 2000-3000 times by the goggles, and BSP has the side effect of lowering resolution [Army 2007A].

Viewing underneath the goggles aided by the landing light or searchlight light works in many instances, but in heavy or severe dust the pilot may still be disoriented due to the intensity. This is likely why the method is not formally recommended. Military helicopters do have infrared searchlights that are considered NVG compatible, but as discussed above, looking through the chin bubble with NVGs requires excessive head movement and provides low resolution viewing, limited FOV, and lack of depth perception. The intensity of the infrared searchlight can also produce disorientation while looking through NVGs in heavy or severe dust just as the landing light can. Although the infrared searchlight has adjustable brightness, it is a very coarse adjustment, has limited directional control, and always defaults to maximum brightness when power to it is cycled.

SUMMARY OF THE INVENTION

Lighting systems and methods for landing in a degraded visual environment are disclosed. The lighting systems comprise one or more lighting units mounted to an aircraft that is operable to hover near a landing zone. Each lighting unit is operable to provide adjustable illumination to the landing zone, and has a radiant power output between a minimum and a maximum. The minimum radiant power output is just sufficient to allow a pilot to distinguish features in the landing zone when below a first altitude wherein the downwash from the aircraft rotors, propellers, or engines begins to raise particulates from the landing zone and continues to be just sufficient to allow the pilot to distinguish features as the pilot descends from the first altitude to termination at the landing zone. The particulates can include dust, sand, water, snow, or ice. The maximum radiant power output is less than about five times the minimum power. In some embodiments the maximum radiant power output is less than about three times the minimum radiant power output. In some embodiments the maximum radiant power output is less than about two times the minimum radiant power output.

Each lighting unit can include a plurality of lighting elements collectively emitting light at a plurality of wavelengths. The plurality of wavelengths produces white, green, and infrared illumination; each illumination can be individually enabled. The plurality of lighting elements can be light emitting diodes (LEDs).

The illuminated area of the landing zone can be approximately equal in size and shape to the field of view of a pilot or crew member looking through a chin bubble or a side door or window of the aircraft. A shroud can be provided, limiting the emission of light to a direction toward the illuminated area of the landing zone.

Each lighting unit further can also include one or more lasers aimed generally in the direction of the illuminated area of the landing zone. The lasers can emit light at a plurality of wavelengths including red, green, and infrared which can be individually enabled. The lasers can be semiconductor lasers each having a power output of between 0.1 mW and 1.0 mW.

One or more lasers can create a pattern on the landing zone which changes as a function of altitude. A spot projected from a laser onto the landing zone can change size as a function of altitude. A spot projected from a laser onto the landing zone can change shape as a function of altitude. Two spots projected from a laser onto the landing zone can have a separation which changes as a function of altitude.

A method for illuminating a landing zone is also provided. One or more lighting units are attached to an aircraft that is operable to perform vertical takeoffs and landings. Each lighting unit is operable to provide adjustable illumination to a landing zone, and has a radiant power output between a minimum and a maximum, wherein the minimum radiant power output is just sufficient to allow a pilot to distinguish features in the landing zone from below a first altitude wherein the aircraft rotors, propellers, or engines begins to raise particulates from the landing zone and continues to be just sufficient to allow the pilot to distinguish features as the pilot descends from the first altitude to termination at the landing zone, and wherein the maximum radiant power output is less than about five times the minimum radiant power output. In some embodiments the maximum radiant power is less than about three times the minimum radiant power output. In some embodiments the maximum radiant power is less than about two times the minimum radiant power output. During an approach or landing of the aircraft, the lighting units are left off until the aircraft descend below the first altitude, and then turned on below a second altitude wherein the second altitude is below the first altitude. The second altitude can be about 20 ft.

BRIEF DESCRIPTION OF THE DRAWINGS

FIGS. 7A, 7B, and 7C show various views of a dust-light prototype.

FIG. 13A shows a second mounting location from a vantage point within the cockpit; FIG. 13B shows the second mounting location from a vantage point outside the cockpit.

FIG. 14 shows a third mounting location.

DETAILED DESCRIPTION

Figure 1:
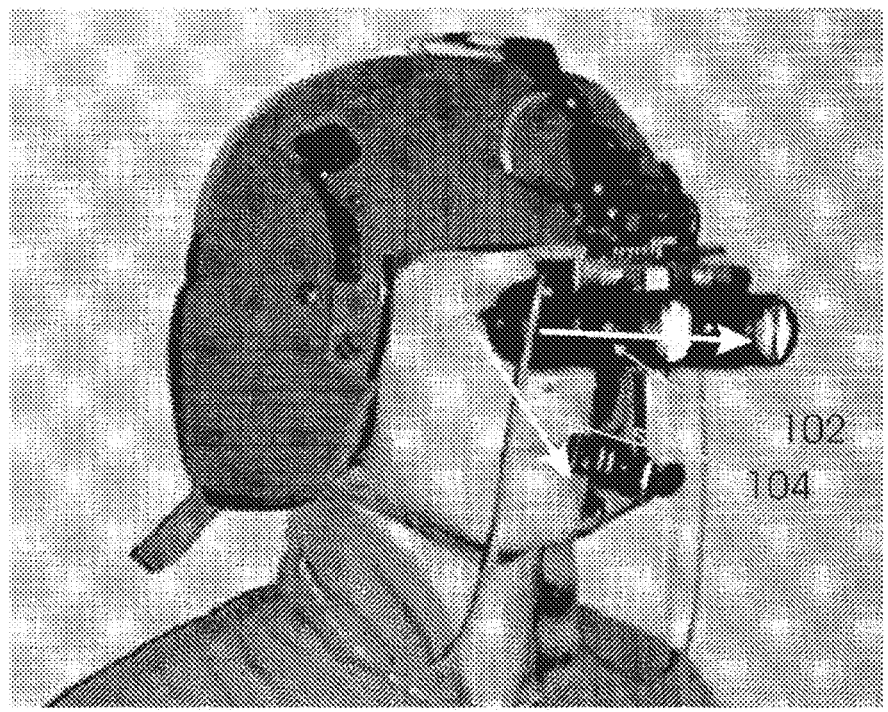
FIG. 1 shows the "cross-check" technique looking through and under NVGs.

Before the present invention is described in detail, it is to be understood that unless otherwise indicated this invention is not limited to specific aircraft or specific lighting modalities. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a lighting unit" includes two or more lighting units, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the term "about" is used in front of a numerical value, the value is deemed to be within ±10% of the numerical value.

As used herein, the term "particulate" refers to any small particles that can become airborne in a landing location either due to rotor downwash or due to local weather conditions. Examples include dust, sand, and snow. Examples described herein are general described using dust as an exemplary but non-limiting embodiment of particulates that can reduce visibility. Exemplary landing zones are dry, dusty surfaces, although degraded visible environments can also occur under conditions of heavy fog, rain, snow, water landings, marsh landings, and so on.

As used herein, the term "light dust" refers to a degraded visual environment (DVE) in which objects and terrain beyond the region of a particulate cloud are visible (i.e., an observer such as a pilot can see through the DVE).

As used herein, the term "moderate dust" refers to a degraded visual environment (DVE) in which only objects and terrain within a particulate cloud are visible (i.e., an observer can see part way through the DVE).

As used herein, the term "heavy dust" refers to a degraded visual environment (DVE) in which no objects or terrain within a particulate cloud is visible (i.e., visibility ends abruptly within the DVE).

As used herein, the term "altitude" refers to the vertical position of an aircraft (height above the Earth's surface) relative to a position where the aircraft is stationary on the Earth's surface.

As used herein, the term "termination" refers to the end state of a landing approach where the "altitude" as defined above has reached zero.

The inventor has surprisingly found that pilots can perform best when using a combination of aided and unaided viewing techniques in the dust environment at night. Accordingly, there is a need for a purpose-built landing illumination system better suited to night-time landing in particulate environments than prior art landing lights.

Figure 2:
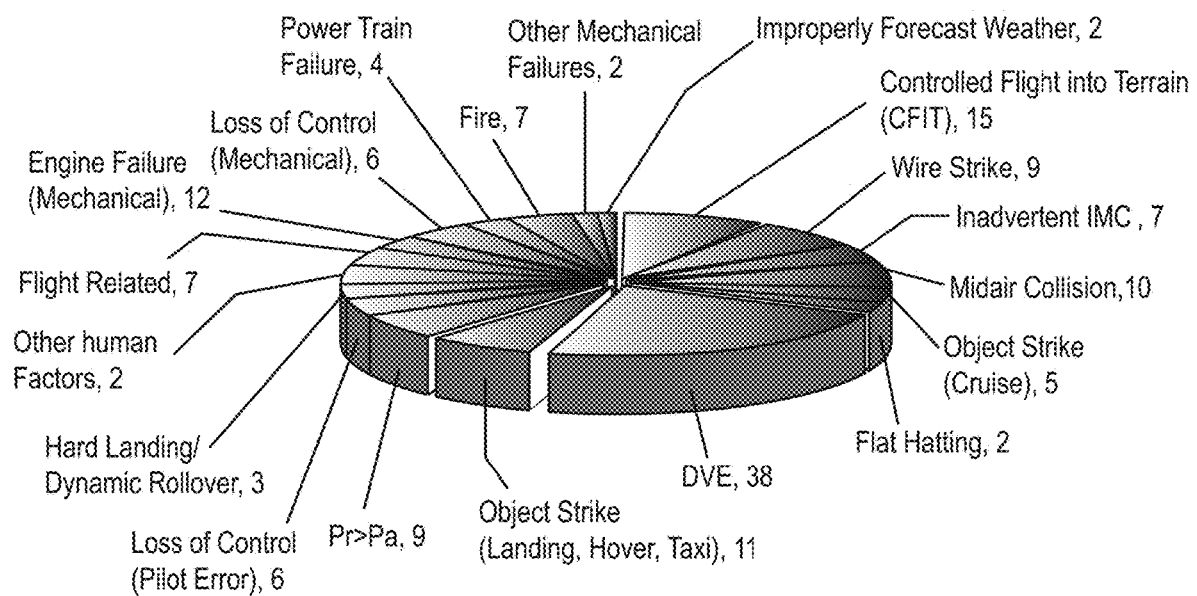
FIG. 2 shows aircraft losses from non-combat causes for 2002-9.

FIG. 2 shows the relative incidence of rotary wing combat non-hostile event losses for the years 2002-9 from a study on rotorcraft safety [Harrington 2010]. "Brownouts" or "degraded visual environment" (DVE), accounted for the greatest number of combat non-hostile losses. The study concluded that an integrated systems approach would be required to overcome the hazards associated with dust environments, suggesting elements such as improved cockpit display symbology and auto-land capabilities.

Currently, such prospective solutions and avionics-based technologies are in different stages of development. Various sensors are used to construct terrain and obstacle imagery displayed inside the cockpit along with corresponding flight symbology. One approach uses millimeter-wave radar to detect obstacle hazards and overlay them onto a known terrain database. Another system uses LADAR combined with a dynamic graphics generator to produce a comparable display interface. While showing potential as integrated brownout landing solutions, workload may be very high for the pilot for obstacle avoidance. One or both pilots' attention needs to be on the new display during the final stages of approach and landing—a departure from conventional methods. The methodology associated with these systems introduces new human factors hazards, and certainly will require formal training and acclimation. These systems will require extensive integration into existing platforms at a considerable cost, particularly on a large-scale retrofit. The required hardware for radar and LADAR systems can weigh between 30 and 100 pounds [Harrington 2010].

Researchers from the University of Glasgow conducted a simulation of helicopter brownout using fluid dynamics software to model various particle properties and their reactions under different flight conditions for both single rotor and tandem rotor configurations. They compared dust simulation results using varying values of the "thrust-normalized advance ratio" [Phillips 2009]. The "thrust-normalized advance ratio" is the helicopter airspeed divided by the rotor blade speed of the helicopter. Essentially, the larger the value of the "thrust-normalized advance ratio", the higher forward airspeed is during the approach. FIGS. 3-5 illustrate that the predicted dust formation gains height and is more pronounced ahead of the aircraft as the approach closure rates become slower.

Figure 3A:
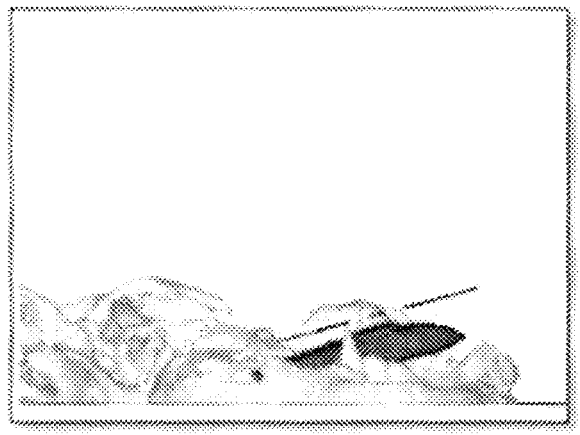
FIG. 3A shows a three-dimensional flow pattern for a thrust-normalized advance ratio of 0.80.
Figure 3B:
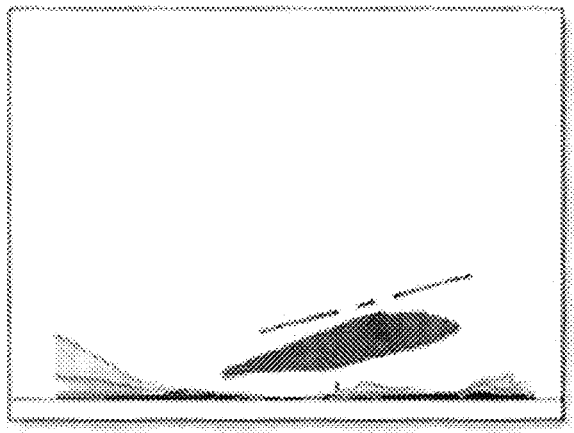
FIG. 3B shows a cross-sectional view of dust density for a thrust-normalized advance ratio of 0.80.
Figure 4A:
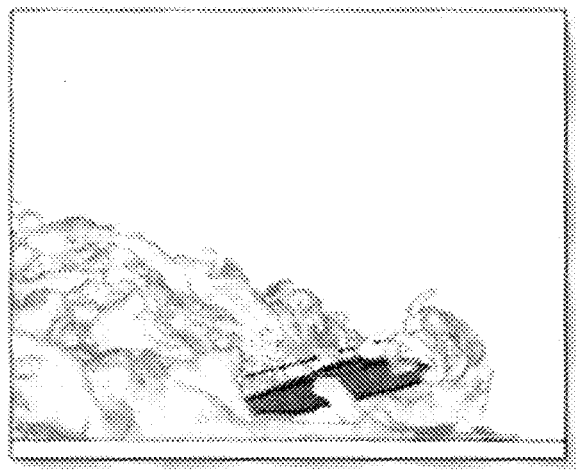
FIG. 4A shows a three-dimensional flow pattern for a thrust-normalized advance ratio of 0.29.
Figure 4B:
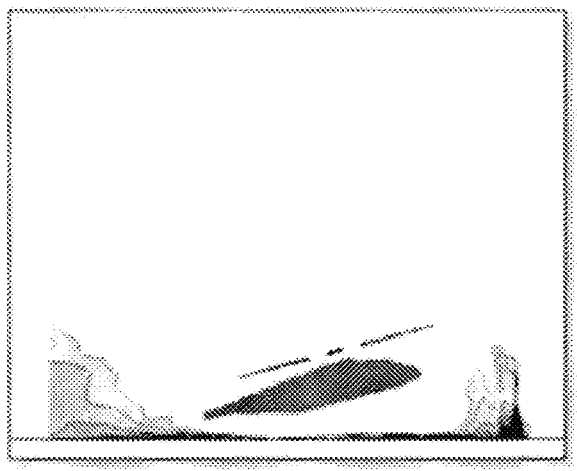
FIG. 4B shows a cross-sectional view of dust density for a thrust-normalized advance ratio of 0.29.
Figure 5A:
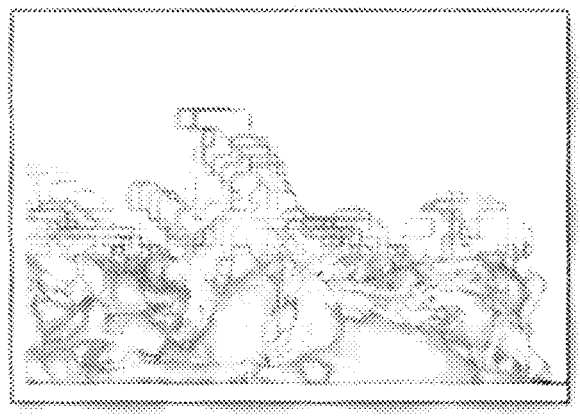
FIG. 5A shows a three-dimensional flow pattern for a thrust-normalized advance ratio of 0.12.
Figure 5B:
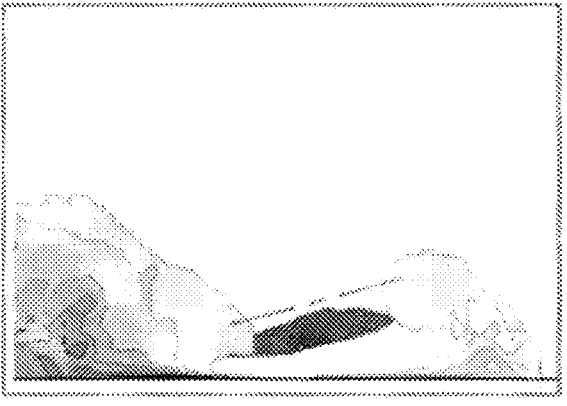
FIG. 5B shows a cross-sectional view of dust density for a thrust-normalized advance ratio of 0.12.

The images in FIGS. 3A, 4A, and 5A show the three-dimensional flow pattern, and the images in FIGS. 3B, 4B, and 5B show the relative cross-sectional dust density. FIGS. 3A and 3B are for a thrust-normalized advance ratio of 0.29. FIGS. 4A and 4B are for a thrust-normalized advance ratio of 0.80. FIGS. 5A and 5B are for a thrust-normalized advance ratio of 0.12. As the forward speed of the aircraft decreases (lower advance ratio), a larger cloud of dust is raised. Note that the area directly beneath and in front of the lower nose section (chin bubble area) has a very low relative dust density in all cases, suggesting that this can be a key area in which visual contact with the ground can be maintained given a suitable illumination method.

Embodiments of the present invention provide improved illumination to aid pilots in landing rotorcraft and VTOL aircraft in particulate (light dust to heavy dust) landing conditions, especially under limited light conditions such as night-time landings and where tactical considerations require the use of low light levels to minimize visibility to outside observers. As will be detailed below, the lighting systems can have multiple modes and levels to provide good visual assistance to the pilot(s) to enable them to see the ground with sufficient visual acuity without making the aircraft excessively visible to outside observers. It should be further noted that, although embodiments are described for rotorcraft and VTOL aircraft that are operable to hover and perform vertical takeoffs and landings, actual landings may not be vertical. In most examples of DVE landings, the approach is not vertical. However, the degradation of the visual environment is still a consequence of the use of a rotating blade or wing surface to generate lift.

In some embodiments, additional landing lighting systems (referred to herein as a "dust-light" systems) can be installed singly or in pairs. A pair of lighting systems, one on each side of the cockpit can be particularly useful for a typical cockpit crew comprising two pilots. Additional systems can also be provided for other crew members. These can be either mounted to the airframe or handheld, for example, by a crew member located at an open doorway.

In some embodiments, the dust-lights are adapted for use in conjunction with NVGs. For example, the pilot can look through the NVGs out of the windshield and cross-check beneath the goggles with the unaided eye through the chin bubble and/or out of the cockpit door or door windows; the pilot need not move their head, just their eyes. Minimal adaptation by the pilots is required; the new lighting system facilitates landing using methods already familiar to trained pilots.

In exemplary embodiments, a system is provided for a Black Hawk helicopter. The typical altitude below which dust envelopment occurs is about 50 ft. Below this altitude, pilots may transition to looking through the chin bubble during an approach. It will be apparent to one of ordinary skill that the lower the altitude from which the lights are employed, the less observable the aircraft will be from the surrounding environment. The lighting system need only provide enough light to aid the pilot in seeing the landing zone visible through the chin bubble at distances of 50 ft or less. In some embodiments, the lighting system is optimized for use below 20 ft. Some observations by the inventor suggest that operation at 20 ft and below provides sufficient light to provide adequate assistance to the pilot in heavy dust conditions.

Figure 6:
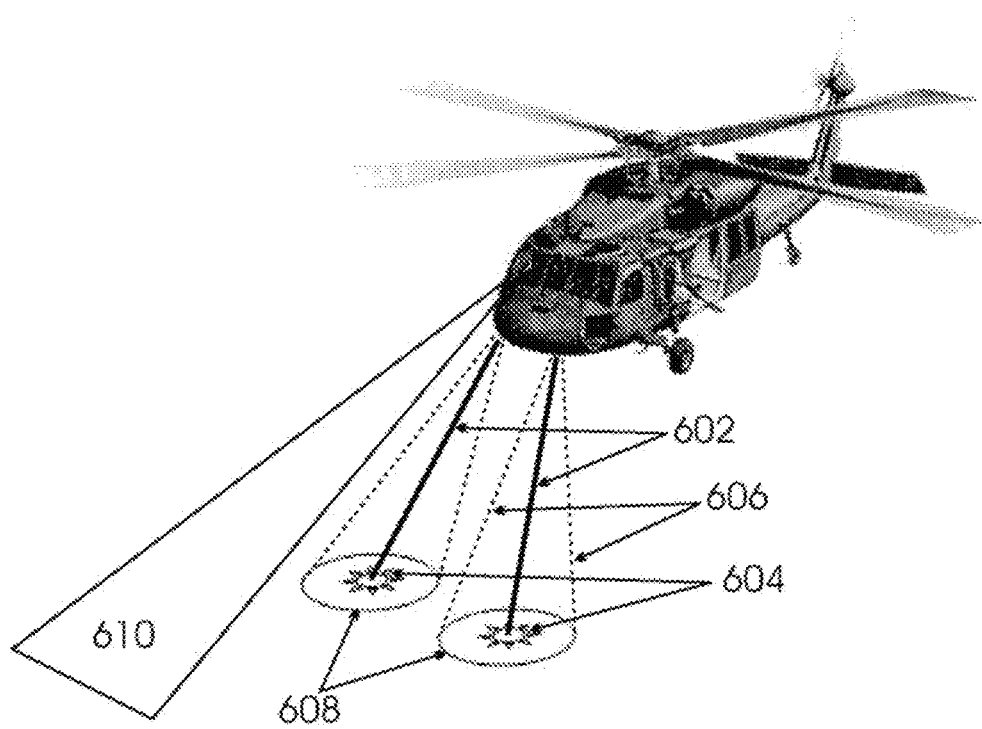
FIG. 6 shows a concept illustration for a dust-light system mounted on a helicopter.

In some embodiments visible light is used of sufficient intensity that the pilot can see the landing zone with the unaided eye below his NVGs. The light can be limited so as not to cause adverse reflections off dust during the approach, particularly through the NVGs. In some embodiments laser light can be used to supplement depth perception by providing an identifiable point where the laser terminates on the surface. The surface immediately surrounding the laser termination point can be illuminated more generally, for example, using LED light sources or other low-level light sources as shown in FIG. 6. In some embodiments the laser light is omitted.

FIG. 6 shows the laser 602 as lines of visible light (e.g., green and/or red) with a termination point 604 shown as a sunburst symbol, exaggerated in size for the purpose of clarity. The LED beam width is represented by the dotted lines 606, and the illuminated surface is represented by the oval 608 surrounding the sunburst. Also shown is the normal FOV 610 of the right-hand pilot through NVGs and the windshield. In some embodiments, the LEDs can be white and/or green for the unaided eye, looking through the chin bubble below the NVGs. In some embodiments, the LEDs and/or laser can be infrared. When infrared light is selected (e.g., for tactical reasons to reduce visibility), the pilot makes all observations through the NVGs moving his head as necessary to look through the NVGs and the chin bubble. In some embodiments, both visible and infrared light sources are provided, and the pilot can choose light sources (and intensities) according to the needs of a particular approach and/or landing. In some embodiments, a green and red laser can be projected simultaneously to provide a beam that is visible in and out of dust conditions. Table 1 provides a reference under which conditions each illumination mode may be visible. The reference to visibility for the LEDs pertains to the target surface, whereas the visibility for the lasers pertains to the beam itself and/or the laser spot projected on the ground.

TABLE 1

Visibility Characteristics of Light Sources in Different Conditions

| Source | No Dust | | Dust | |
|---|---|---|---|---|
| | Unaided | Aided | Unaided | Aided |
| LED | | | | |
| White | X | X | X | X |
| Green | X | | X | |
| Infrared | | X | | X |
| *Laser | | | | |
| Red | | X | X | X |
| Green | X | | X | |
| Infrared | | X | | X |

*indicates beam or spot is visible.

The specifications for the lasers and low-level light sources can vary according to the needs of a particular aircraft and its landing characteristics. The output power can be made adjustable, either by the pilot directly, or with the assistance of some form of automated intensity adjustment aided by a reflected light sensor. An automated system can provide just enough light to provide a desired reflected light intensity returned to the aircraft with a maximum allowed level based on tactical considerations.

Any laser source providing a beam of appropriate wavelength and power can be used. In the configuration of Example 1, three lasers, two visible and one infrared are provided to accommodate different terrain, particulate, and tactical situations. The pilot can select whichever provides the best visibility subject to operating constraints. Typically, Class I lasers with an output power of 0.1-1 mW are suitable, although other powers can also be used. These lasers can be semiconductor lasers such as those used in laser-pointing and laser-sighting applications. A typical green laser can have a wavelength of about 532 nm; a typical red laser can have a wavelength of about 650 nm; and a typical infrared laser can have a wavelength of about 830 nm, although these wavelengths can vary, and other wavelengths can be used. In some embodiments, the light from the laser is well-collimated such that the projected spot size on the ground is substantially constant during approach. In some embodiments, the laser can be focused or divergent with either fixed or adjustable focal length/divergence angle. A converging or diverging beam can be adjusted so that the projected spot size on the ground changes with altitude and provides an additional visual cue to the pilot as to current altitude at short range where conventional radar and barometric altimeters do not provide adequate precision and accuracy. Astigmatism can also be deliberately used such that the projected spot has an aspect ratio that changes with altitude. For example, a cylindrical lens can provide a different effective focal length along one axis compared to a perpendicular axis. A round spot will be projected at one altitude, and the spot will appear to be elongated along one axis of the other as the altitude deviates from that giving the round spot. In some embodiments, the focal lengths are adjusted to give a round spot at termination. In some embodiments two lasers can be aimed at different angles such that the separation of their projected spots varies with altitude. In some embodiments the projected spots coincide when termination is reached.

The laser spots can provide useful visual cues as to the location of a surface that may be otherwise difficult to see through the particulates and low-light conditions. A larger illuminated area can also be valuable to aid the pilot in landing at a particular target location, avoiding any local obstacles either on or above the ground. In some embodiments, the larger illuminated area is defined by a FOV around the laser spot, although it is also possible to point the laser spot and illuminated area independently toward different locations. Any low-level illumination source can be used, including conventional landing lights set at low power, although typical aircraft control systems are not configured to operate landing lights with the small FOV and low intensities optimal for particulate environments and tactical or clandestine operations. The power levels for conventional landing lights and search lights can be more than an order of magnitude higher than those of an ideal dust-light system. Accordingly, a dedicated dust-light system can be a preferred implementation.

In some embodiments LEDs are used and can provide a suitable combination of power level and controllability. In some embodiments an array of LEDs of each wavelength is provided. These can be arranged in any convenient geometric configuration, the ring arrangement described in Example 1 being only one of many possible configurations that would be apparent to one of skill in the art. The minimum total radiant power output should be just sufficient to provide ground visibility to the pilot as he descends below a particular altitude such as the 50 ft or 20 ft suggested above for use with the Black Hawk helicopter. The maximum radiant power output should be limited so as not to provide more light than is necessary to assist the pilot, for example, no more than 2, 3, or 5 times the minimum radiant power output. For tactical use, the illumination level can be further controlled, either manually or automatically so as to maintain only the minimum level needed at any given time and location. The illuminated area can be kept small to match the FOV of the pilot looking, for example, through the chin bubble. The light assembly can be further shrouded and aimed so that the light has low visibility to any observer outside the FOV. In some embodiments the total power for each array of LEDs can be less than about 10 W or about 20 W depending on the size and configuration of the particular, aircraft. By comparison, the typical prior art landing lights and searchlights operate at or above about 600 W and 250 W respectively, and cannot readily provide the low-level controlled intensities of the dust-light system, even if it were possible to aim them in a useful direction for illuminating the surface seen through the chin bubble.

While light can penetrate particulates to some extent, a dust-light system can only physically increase visibility to what may be observed during equivalent dust conditions in daylight. Dust-light systems can aid in maintaining or establishing outside references in what would otherwise be total darkness, or particulate-entrained NVG-green-hued rotorwash.

In some embodiments, the aim of the dust-light system is fixed at installation based on an average pilot size and eye location. In some embodiments, fine tuning of the beam direction can be provided using a suitable gimbal mount with two axes of adjustment. The adjustment can allow optimization of the aim of the dust-light system for a particular combination of pilot, seat adjustments, and aircraft.

Example 1: A Multiwavelength Dust-Light Assembly with Both LEDs and Lasers

FIGS. 7A, 7B, and 7C show views of a design for an exemplary dust-light assembly. A 5-inch diameter mounting flange has a depth of about 2-3 in, and a weight of about 5 lbs. Three central recesses 702 are provided to mount red, green, and infrared semiconductor lasers. The surrounding recesses 704-708 house the LEDs by type in concentric rings. From inner to outer rings the order is infrared 704, green 706, and white 708. The chamfered outer ring is designed to collimate the LED beam so that it only illuminates a target area consistent with the FOV available through a single chin bubble at 50 ft and below. In addition, the outer ring serves to shroud the light source from outside observation in a tactical environment. The inner face of the dust-light is further protected by a scratch-proof, non-reflective, tinted glass which also aids in reducing outside observation.

Figure 8:
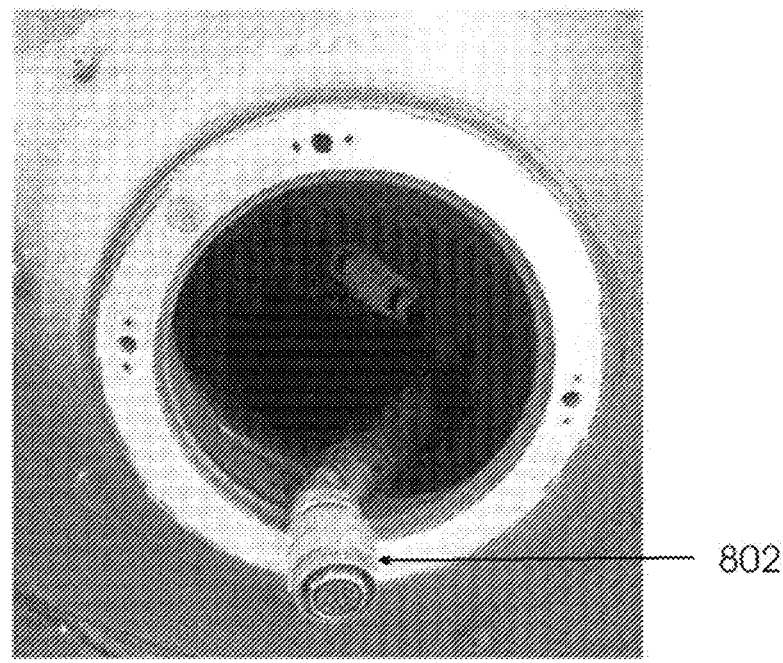
FIG. 8 shows an example mounting structure and connections.

The outer flange of the unit mounts flush to the aircraft exterior to a fixed flange using four bolts with thread locking compound, and further sealed around the perimeter of the unit using standard nonpermanent compound (e.g., PROSEAL® made by Proseal, Adlington, Cheshire UK). The mounting configuration would be similar to that of the Electro-Optic Missile Sensors (EOMS) of the Common Missile Warning System (CMWS), shown in FIG. 8.

Power can be provided to the back of the unit via a plug connection 802, supplying 28 VDC from the number 2 DC primary bus.

Example 2: Aircraft Integration

Figure 9:
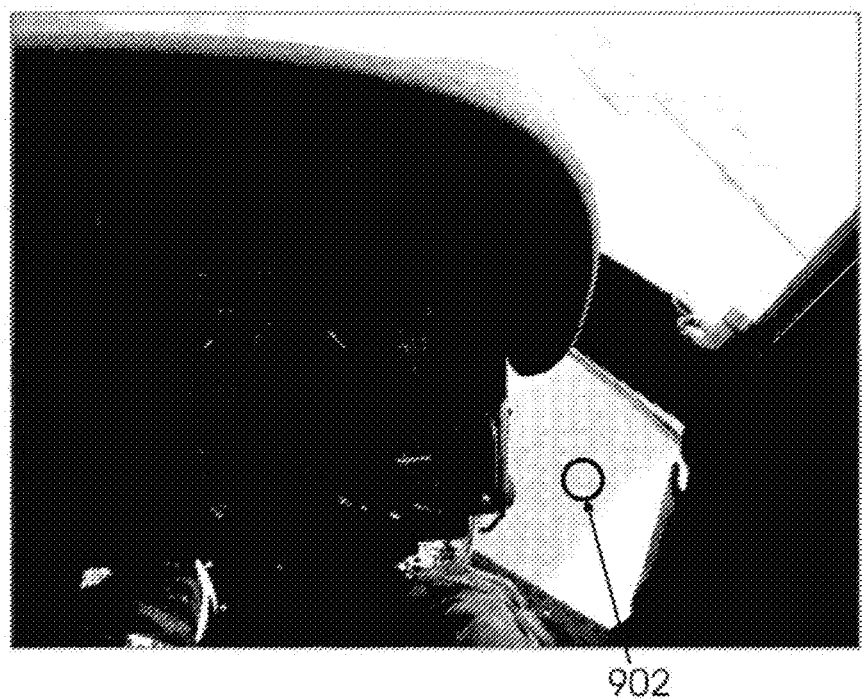
FIG. 9 shows the chin bubble FOV for the right pilot in a Black Hawk helicopter

In order to adapt a dust-light system to a specific airframe, the ergonomics of the cockpit layout and nose section of the aircraft must be taken into account. One of the primary considerations is the FOV from the pilots' perspective through the chin bubble. In this example, integration is described for a Black Hawk helicopter. The chin bubble in a Black Hawk is reasonably sized, but does not provide much forward looking capability. Rather it provides more lateral and downward visibility as shown in FIG. 9.

A superimposed ring 902 shows the approximate center of the FOV through the chin bubble for the right-hand pilot. When the aircraft is on the ground, the fixed dust-lights can be aimed at their respective chin bubble FOV center. The seat position from which the image in FIG. 9 was captured is full aft, and mid-position height, in accordance with the design eye point for a 70-inch tall pilot. The design eye point for the UH-60 in accordance with the Army field manual [Army 2007A], is to have the ground in view beginning at 12 ft from the nose (with the aircraft on the ground). Measuring from the approximate pilot's eye position, the viewing angle ranges are found to be approximately 42-49° down and approximately 18-22° outward. The seats are capable of adjusting a total of 5 inches fore/aft and up/down. The anti-torque pedals to the left of the superimposed ring 902 are shown full forward, but can be adjusted fore/aft a total of 6.5 inches. The FOV from the left pilot seat is approximately the same. These measurements cannot account for every possible combination of height, seat position, pedal adjustment, and anthropometric variability, but they are valid for the majority of military aviators given the constraints of the HH-60L cockpit.

Figure 10A:
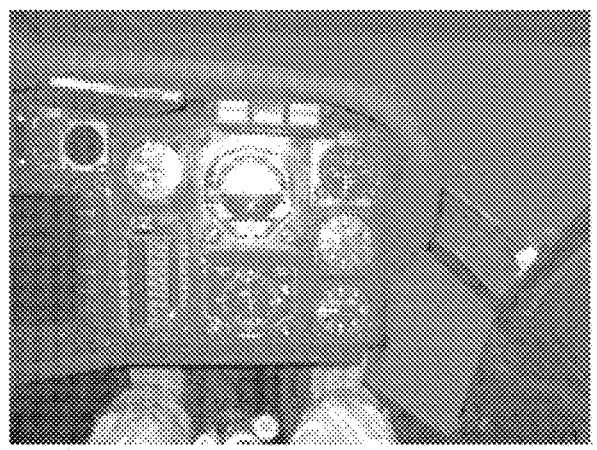
FIG. 10A shows the surface visible through the chin bubble.
Figure 10B:
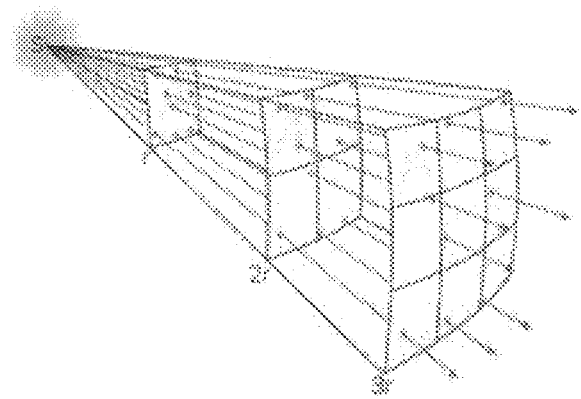
FIG. 10B illustrates the inverse square law.

Visible surface area outside the chin bubble from the pilot's perspective is approximately 6.5 ft$^2$ with the aircraft on the ground. This was measured by placing rigid plastic sheets marked with square foot gridlines beneath the chin bubble and estimating the visible area as shown in FIG. 10A. Following the inverse square law in regard to area, as shown in FIG. 10B, it is evident that visible area increases by multiplying by the square of the radius (distance) r, where r is the distance from the pilot's eyes to the ground along the central FOV axis, i.e., 9 ft.

At 50 ft altitude, measured from the Earth's surface to the radar altimeter antenna, the pilot's eyes are 54.5 ft above the surface; 54.5 ft divided by 9 ft equals 6.05 r, squaring 6.05 equals 36.67, and multiplying this result by 6.5 ft² yields 238.35 ft². Therefore, the area visible through the chin bubble at 50 ft altitude is approximately 238.35 ft² This is equivalent to a square surface area of 15.44×15.44 ft, or a circular surface area 17.42 ft in diameter. Note these are estimates based on specific eye point with the aircraft at a level attitude. Shifting of the pilot's head and changing the aircraft pitch attitude can alter this figure drastically. But these estimates can be used to establish a baseline figure for a preliminary design.

Figure 11:
FIG. 11 shows two proposed mounting locations for dust-lights on a Black Hawk helicopter.
Figure 12:
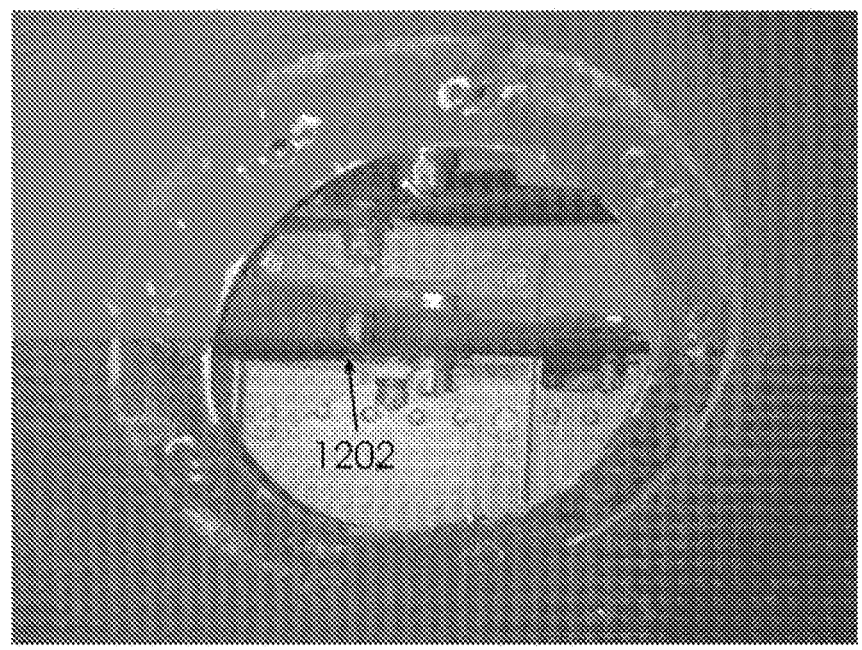
FIG. 12 shows a first mounting location with the access panel removed.

The dust-light can be located in an area which can readily provide the proper positioning for the system to work effectively, while minimizing the required modification to existing airframe structure. Two primary locations 1102 and 1104 are identified in FIG. 11. Location 1102 requires minimal modification due to an existing maintenance access panel. Only the panel itself would require modification; the dust-light would be directly mounted to the panel. Alternatively, the dust-light can be provided as a direct bolt-on replacement for the access panel. The addition of the dust-light would not interfere with normal maintenance actions associated with this location. FIG. 12 shows the area located directly behind the panel at location 1102. Flight control linkages 1202 are visible behind the panel, but are several inches from the panel itself leaving sufficient room for the dust-light system hardware. Internal space is, however, more limited than at location 1104. The more significant issue that complicates using location 1102 is that the dust-light must project at a significant angle relative to the centerline axis of the mounting hole in order for it to be effective. This would require either angling the face of the dust light, or adding an angled-mirror modification to project the beam properly.

Location 1104 offers placement of the dust-light that is more aligned with the required aiming direction for the dust-light. The drawback is that location 1104 would require more airframe modifications than location 1102. The modifications required would consist of cutting sheet metal and drilling using a circular template, which may or may not be considered a unit-level maintenance action, depending on the organizational resources. FIG. 13A shows location 1104 from a vantage point within the cockpit and FIG. 13B shows location 1104 from a vantage point outside the cockpit. The intended location of the sheet metal modification and dust-light installation is indicated by the circle 1302. The control rod running through the circle is offset above and to the side of the mounting site, and will not cause interference.

If the AN/AVR-2B Laser Warning System is installed on the aircraft, the associated mounting structure can also serve as a potential location 1402 for the dust-lights as shown in FIG. 14. Location 1402 is compatible with achieving the proper beam angle and is practical in that it only requires modification to an existing modular component, requiring no direct airframe modification.

Figure 15:
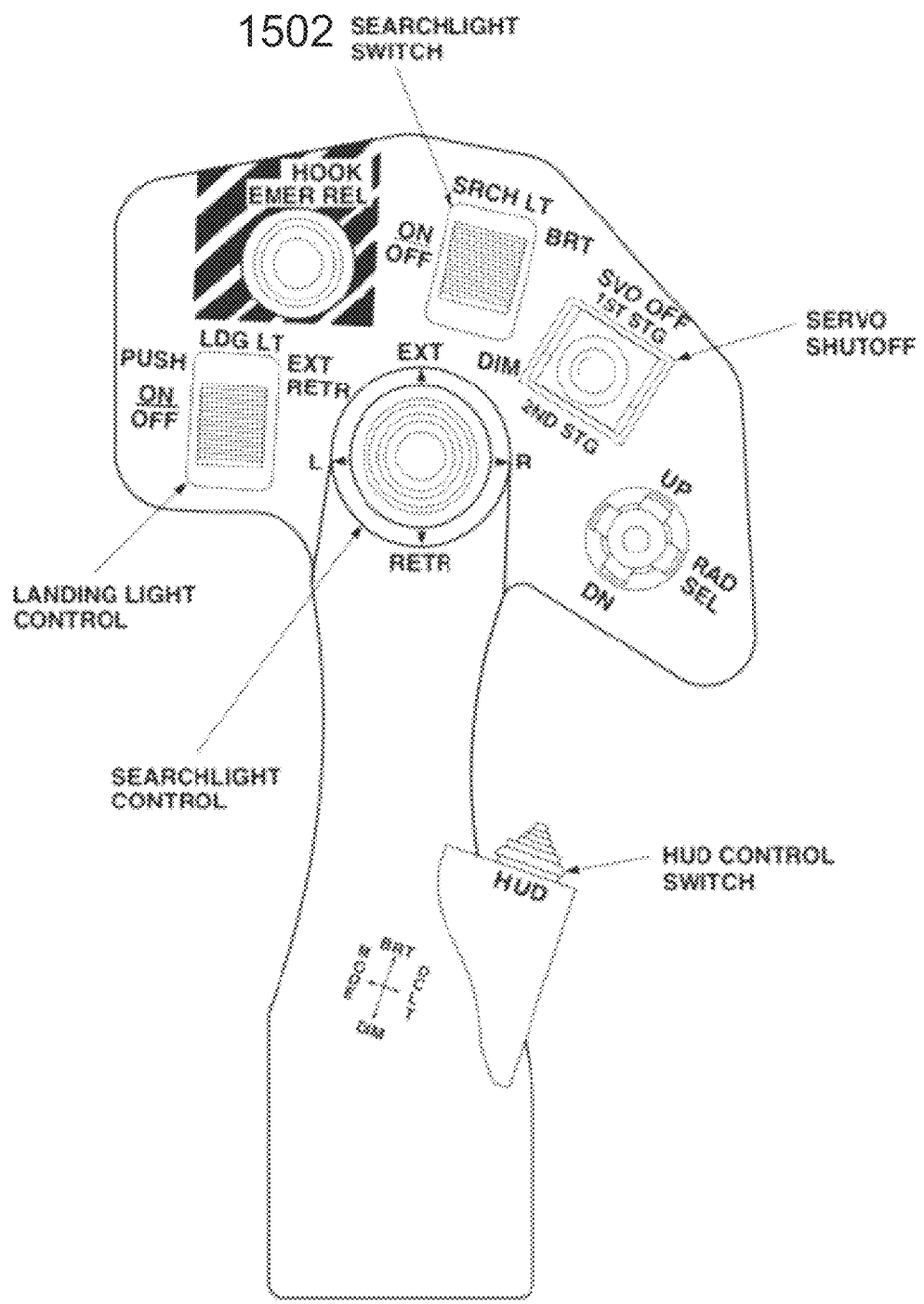
FIG. 15 shows an example switch arrangement on an HH-60L collective.

The dust-lights can be controlled via a rocker switch mounted on the collective. The collective is shown in FIG. 15, depicting where several existing light functions can be controlled. One control option is to replace the existing searchlight rocker switch 1502 with a split rocker switch, one side for the dust-light modes, and the other remaining side for searchlight functions. This placement would be a seamless integration, requiring no change to the pilots' natural hand placement. The only change would be in tactile identification of the appropriate switch. Given the vast diversity of switches available, and the ample size of the Black Hawk collective control head, it would be a suitable option.

Example 3: An Approach Sequence

Figure 16A:
FIG. 16A shows the cockpit view during heavy dust approach at 19 ft aboveground level (AGL).

FIGS. 16A, 16B, 17A, and 17B show a photo sequence taken during a single approach into a heavy dust landing zone. Looking closely, one can observe the dust formation and visibility in relation to altitude. FIG. 16A shows the aircraft at 19 ft above ground level; the dust cloud is beginning to come into view from the cockpit.

Figure 16B:
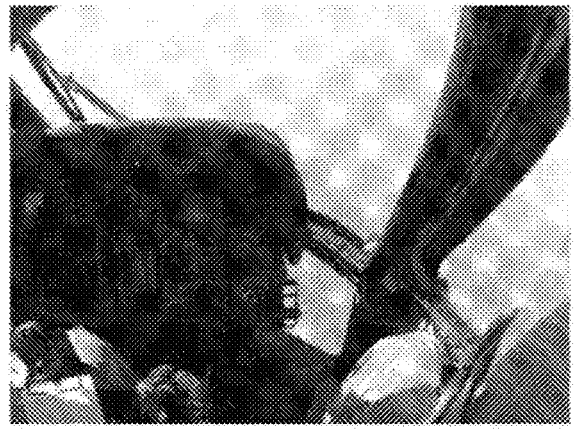
FIG. 16B shows the cockpit view during heavy dust approach at 9 ft AGL.
Figure 17A:
FIG. 17A shows the cockpit view during heavy dust approach at 3 ft AGL.

The dust obscures the chin bubble first as the rotorwash begins to shear material from the surface. As the helicopter closes on a landing surface, a surrounding wall of dust forms, and the FOV through the chin bubble begins to clear, as shown in FIG. 16B, where the aircraft is at 9 ft above ground level. This is consistent with the dust simulation models shown in [Phillips 2009] that are reproduced in FIGS. 3A, 3B, 4A, 4B, and 5A, 5B. As the helicopter continues to descend, the surrounding dust-entrained air mass begins to circulate through the rotor system, further degrading visibility as shown in FIG. 17A, where the aircraft is at 3 ft above ground level.

Figure 17B:
FIG. 17B shows the cockpit view during heavy dust approach at termination.

However, visibility continues to improve through the chin bubble all the way to termination on the ground illustrated in FIG. 17B. The illustrated approach was made to a specific point with low touchdown speed resulting in about a one foot roll-out. The wind was from approximately 270° at approximately 20 knots and the approach direction was 310°. Conducting this approach at night using NVGs would have been far more challenging, and could have easily resulted in a go-around. The area beneath the chin bubble would have been completely dark and would have offered no outside reference to the unaided eye; the pilot would have had to repeatedly move his head downward to look through the chin bubble using his NVGs to gain reference during this critical stage. Making such head movements is not ideal and potentially unsafe.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

REFERENCES

[Army 2007A] *Field Manual* 3-04.203 *Fundamentals of Flight*, Dept. of the Army, Washington, D.C.

[Army 2007B] *Training Circular* 1-237*Aircrew Training Manual, Utility Helicopter, H-60 Series*, Dept. of the Army, Washington, D.C.

[Army 2008] *Army Regulation* 95-1*Aviation Flight Regulations*, Dept. of the Army, Washington, D.C.

[Army 2010] *Technical Manual* 1-1520-253-10 *Operator's Manual for HH-60L Helicopter*, Dept. of the Army, Washington, D.C.

[Army 2013] *Training Circular* 3-04.33*Aircrew Training Manual, Utility Helicopter, H-60 Series*, Dept. of the Army, Washington, D.C.

[Harrington 2010] Harrington, W. et al., "3D-LZ Brownout Landing Solution," American Helicopter Society 66th Annual Forum, Phoenix, Ariz., *Ann. Forum Proc.—AHS*, 66 (2010), 983-1001.

[Phillips 2009] Phillips, C. & Brown, R. E., (2009): "Eulerian Simulation of the Fluid Dynamics of Helicopter Brownout," *Journal of Aircraft*, 46 (2009), 1416-29, doi: 10.2514/1.41999.

What is claimed is:

1. Apparatus for establishing and maintaining a visual reference on a surface below an aircraft for the purpose of landing the aircraft, the apparatus comprising:
    at least one laser configured to provide a laser beam terminating in a laser spot or a laser pattern on a surface below an aircraft,
    the at least one laser configured to be mounted to the aircraft in a fixed direction that will remain fixed during flight,
    thereby providing a visual reference on a surface viewable from the aircraft so as to facilitate landing of the aircraft; and
    a light assembly configured to house the at least one laser and maintain the at least one laser in the fixed direction, the light assembly configured to also house at least one non-laser light source,
    the at least one non-laser light source aimed in a direction that is substantially parallel to the fixed direction of the at least one laser.

2. The apparatus of claim 1, wherein the light assembly includes an outer ring serving as a shroud, the outer ring extending around a front face of the light assembly, and extending from the front face of the light assembly in substantially the fixed direction of the at least one laser.

3. The apparatus of claim 1, wherein the at least one non-laser light source is a light emitting diode.

4. The apparatus of claim 1, wherein the at least one non-laser light source further includes:
    a plurality of non-laser light sources configured to emit light at a plurality of respective wavelengths.

5. The apparatus of claim 4, wherein the plurality of respective wavelengths includes: white, green, and infrared.

6. The apparatus of claim 1, wherein the at least one laser further includes: a plurality of lasers configured to emit light at a plurality of respective wavelengths.

7. The apparatus of claim 6, wherein the plurality of respective wavelengths includes: red, green, and infrared.

8. The apparatus of claim 1, wherein the laser spot or laser pattern projected from the at least one laser changes size as a function of altitude.

9. The apparatus of claim 1, wherein the at least one laser is configured to provide a laser beam at a power level of no more than 1 mW.

10. The apparatus of claim 1,
    wherein the laser beam terminates in a laser pattern, and
    wherein the at least one laser is configured to be mounted to the aircraft in the fixed direction such that the laser spot or pattern of the laser beam falls within a field of view of either a chin bubble or a windshield or a cockpit door window of the aircraft.

11. The apparatus of claim 1, wherein the fixed direction is convergent with respect to a visual axis extending through a center of a field of view of a chin bubble of the aircraft, such that an intersection of the fixed direction and the visual axis exists under the aircraft.

12. The apparatus of claim 11, wherein the visual axis is a center of a viewing angle range being substantially 42-49 degrees downward and substantially 18-22 degrees outward.

13. The apparatus of claim 1, wherein the laser is mounted on a lower portion of the nose area of the aircraft.

14. The apparatus of claim 1, wherein the laser is mounted as close as possible to a perimeter of a chin bubble of the aircraft.

15. The apparatus of claim 1, wherein the laser is configured to be divergent so that the projected laser spot or laser pattern on the ground changes size as a function of altitude.

16. The apparatus of claim 1, wherein the apparatus further includes:
    a second laser, the second laser being aimed at a second fixed direction different from the fixed direction of the at least one laser, such that a separation distance of their respective laser spot or laser pattern on the surface below an aircraft varies with altitude.

17. Apparatus for establishing and maintaining a visual reference on a surface below an aircraft for the purpose of landing the aircraft, the apparatus comprising:
    at least one laser configured to provide a laser beam terminating in a laser spot or a laser pattern on a surface below an aircraft,
    the at least one laser configured to be mounted to the aircraft in a fixed direction that will remain fixed during flight,
    thereby providing a visual reference on a surface viewable from the aircraft so as to facilitate landing of the aircraft; and
    a light assembly configured to house the at least one laser and maintain the at least one laser in the fixed direction, the light assembly configured to also house a plurality of non-laser light sources configured to emit light at a plurality of respective wavelengths.

18. The apparatus of claim 17, wherein the light assembly includes an outer ring serving as a shroud, the outer ring extending around a front face of the light assembly, and extending from the front face of the light assembly in substantially the fixed direction of the at least one laser.

19. The apparatus of claim 17, wherein the at least one non-laser light source is a light emitting diode.

20. The apparatus of claim 17, wherein the at least one non- laser light source is aimed in a direction that is substantially parallel to the fixed direction of the at least one laser.

21. The apparatus of claim 17, wherein the plurality of respective wavelengths includes: white, green, and infrared.

22. The apparatus of claim 17, wherein the at least one laser further includes: a plurality of lasers configured to emit light at a plurality of respective wavelengths.

23. The apparatus of claim 22, wherein the plurality of respective wavelengths includes: red, green, and infrared.

24. The apparatus of claim 17, wherein the laser spot or laser pattern projected from the at least one laser changes size as a function of altitude.

25. The apparatus of claim 17, wherein the at least one laser is configured to provide a laser beam at a power level of no more than 1 mW.

26. The apparatus of claim 17,
    wherein the laser beam terminates in a laser pattern, and
    wherein the at least one laser is configured to be mounted to the aircraft in the fixed direction such that the laser spot or pattern of the laser beam falls within a field of view of either a chin bubble or a windshield or a cockpit door window of the aircraft.

27. The apparatus of claim 17, wherein the fixed direction is convergent with respect to a visual axis extending through a center of a field of view of a chin bubble of the aircraft, such that an intersection of the fixed direction and the visual axis exists under the aircraft.

28. The apparatus of claim 27, wherein the visual axis is a center of a viewing angle range being substantially 42-49 degrees downward and substantially 18-22 degrees outward.

29. The apparatus of claim 17, wherein the laser is mounted on a lower portion of the nose area of the aircraft.

30. The apparatus of claim 17, wherein the laser is mounted as close as possible to a perimeter of a chin bubble of the aircraft.

31. The apparatus of claim 17, wherein the laser is configured to be divergent so that the projected laser spot or laser pattern on the ground changes size as a function of altitude.

32. The apparatus of claim 17, wherein the apparatus further includes:
a second laser, the second laser being aimed at a second fixed direction different from the fixed direction of the at least one laser, such that a separation distance of their respective laser spot or laser pattern on the surface below an aircraft varies with altitude.

33. Apparatus for establishing and maintaining a visual reference on a surface below an aircraft for the purpose of landing the aircraft, the apparatus comprising:
at least one laser configured to provide a laser beam terminating in a laser spot or a laser pattern on a surface below an aircraft,
the at least one laser configured to be mounted to the aircraft in a fixed direction that will remain fixed during flight,
thereby providing a visual reference on a surface viewable from the aircraft so as to facilitate landing of the aircraft,
the at least one laser including a plurality of lasers configured to emit light at a plurality of respective wavelengths.

34. The apparatus of claim 33, further comprising:
a light assembly configured to house the at least one laser and maintain the at least one laser in the fixed direction.

35. The apparatus of claim 34, wherein the light assembly includes an outer ring serving as a shroud, the outer ring extending around a front face of the light assembly, and extending from the front face of the light assembly in substantially the fixed direction of the at least one laser.

36. The apparatus of claim 34, wherein the light assembly is configured to also house at least one non-laser light source.

37. The apparatus of claim 36, wherein the at least one non-laser light source is a light emitting diode.

38. The apparatus of claim 36, wherein the at least one non-laser light source is aimed in a direction that is substantially parallel to the fixed direction of the at least one laser.

39. The apparatus of claim 36, wherein the at least one non-laser light source further includes:
a plurality of non-laser light sources configured to emit light at a plurality of respective wavelengths.

40. The apparatus of claim 39, wherein the plurality of respective wavelengths includes: white, green, and infrared.

41. The apparatus of claim 33, wherein the plurality of respective wavelengths includes: red, green, and infrared.

42. The apparatus of claim 33, wherein the laser spot or laser pattern projected from the at least one laser changes size as a function of altitude.

43. The apparatus of claim 33, wherein the at least one laser is configured to provide a laser beam at a power level of no more than 1 mW.

44. The apparatus of claim 33,
wherein the laser beam terminates in a laser pattern, and
wherein the at least one laser is configured to be mounted to the aircraft in the fixed direction such that the laser spot or pattern of the laser beam falls within a field of view of either a chin bubble or a windshield or a cockpit door window of the aircraft.

45. The apparatus of claim 33, wherein the fixed direction is convergent with respect to a visual axis extending through a center of a field of view of a chin bubble of the aircraft, such that an intersection of the fixed direction and the visual axis exists under the aircraft.

46. The apparatus of claim 45, wherein the visual axis is a center of a viewing angle range being substantially 42-49 degrees downward and substantially 18-22 degrees outward.

47. The apparatus of claim 33, wherein the laser is mounted on a lower portion of the nose area of the aircraft.

48. The apparatus of claim 33, wherein the laser is mounted as close as possible to a perimeter of a chin bubble of the aircraft.

49. The apparatus of claim 33, wherein the laser is configured to be divergent so that the projected laser spot or laser pattern on the ground changes size as a function of altitude.

50. The apparatus of claim 33, wherein the apparatus further includes:
a second laser, the second laser being aimed at a second fixed direction different from the fixed direction of the at least one laser, such that a separation distance of their respective laser spot or laser pattern on the surface below an aircraft varies with altitude.

* * * * *